United States Patent

Repay et al.

[11] 3,881,325
[45] May 6, 1975

[54] OVERRIDE CLUTCH

[75] Inventors: Laszlo N. Repay, Chagrin Falls; Thomas A. Young, Burton, both of Ohio

[73] Assignee: Tenna Corporation, Cleveland, Ohio

[22] Filed: Sept. 21, 1973

[21] Appl. No.: 399,301

[52] U.S. Cl.................. 64/29; 192/56 R; 242/54
[51] Int. Cl.............................................. F16d 3/56
[58] Field of Search....... 64/29, 28 R, 30 R; 192/56; 242/54

[56] References Cited
UNITED STATES PATENTS

| | | | |
|---|---|---|---|
| 2,145,083 | 1/1939 | Dynes | 64/29 |
| 2,593,700 | 4/1952 | Rosner | 64/29 |
| 2,802,354 | 8/1957 | Bohnhoff et al. | 64/29 |
| 2,806,366 | 9/1957 | Woestemeyer | 64/29 |
| 2,831,648 | 4/1958 | Meyer et al. | 64/29 |
| 2,896,870 | 7/1959 | Ulrich | 242/54 |
| 3,754,412 | 8/1973 | Briggs | 64/29 |

Primary Examiner—Samuel Scott
Assistant Examiner—Randall Heald
Attorney, Agent, or Firm—Baldwin, Egan, Walling & Fetzer

[57] ABSTRACT

A mechanism for coupling a motor to a driving element for actuating an attached member, such as for instance extending and retracting a vehicle radio antenna. A rotatable actuating member is provided for actuating the driving element. Clutching means operates to clutch the rotatable actuating member to the motor for drivingly rotating the actuating member. The clutching means including a rotatable clutch member coupled to the motor. The rotatable actuating member and the clutch member have abutments thereon, which abutments when disposed in confronting engaged relation, cause rotation of the actuating member upon rotation of the motor driven clutch member. The abutments are staggered with respect to the axes of rotation of the clutch and actuating members for driving of the actuating members in both rotary directions. Ramp-like structure coacts with the abutments on one of the members for preventing noisy movement of the abutments relative to one another in the event that the driving connection between the clutch member and the actuating member is released when the stress between the abutments results in an overload, causing the abutments on one of the members to ride over the confronting abutments on the other of the members, and thereby providing smooth, substantially noiseless overload release for the mechanism.

19 Claims, 19 Drawing Figures

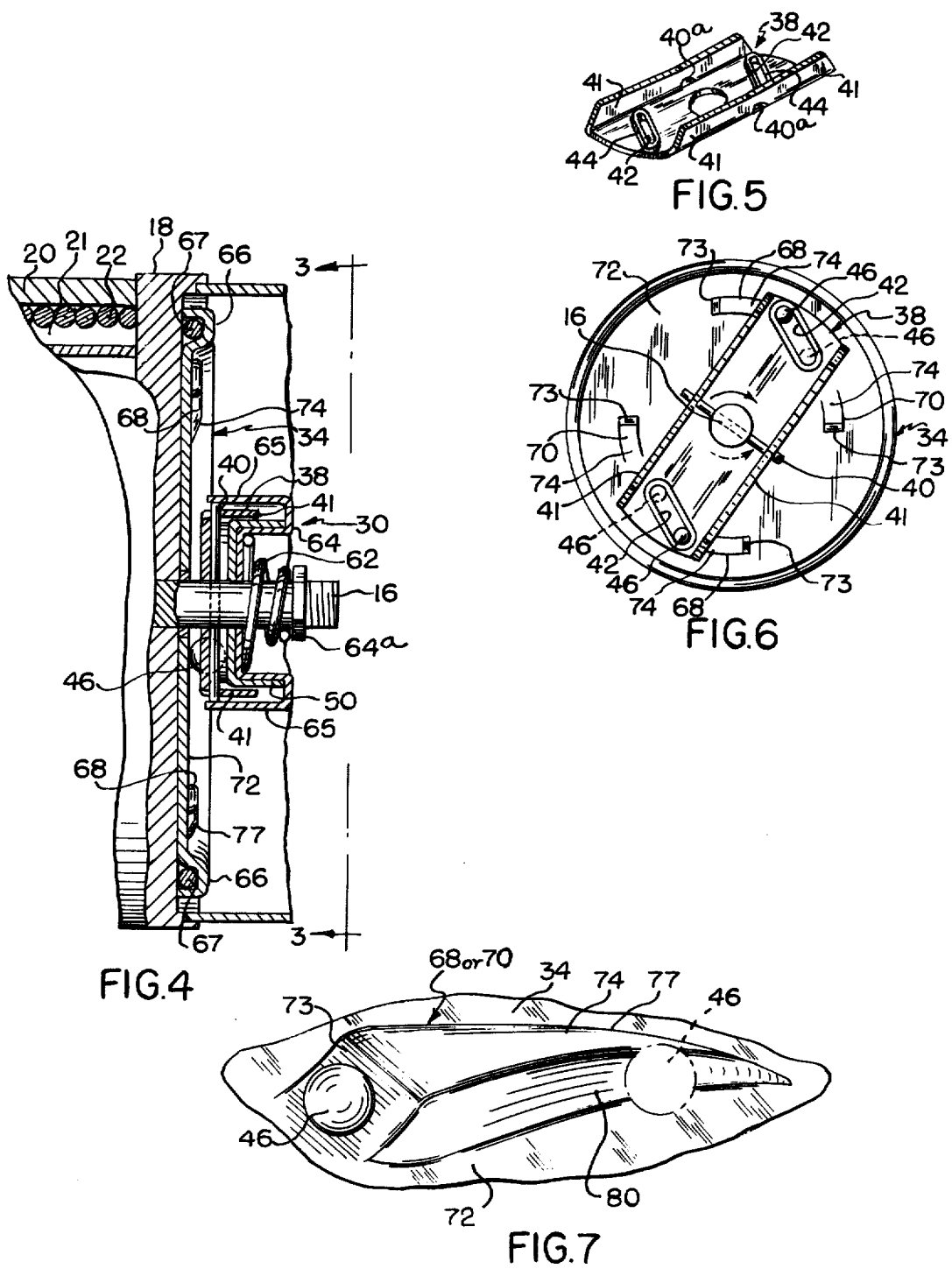

OVERRIDE CLUTCH

This invention relates in general to mechanism for actuating a driving member in a remote controlled system and a clutching mechanism therefor which provides an overload release that prevents damage to the driving motor, and more particularly a clutching arrangement in which undesirable noise and movement is obviated during overload release thereof and during operation of the clutching mechanism.

BACKGROUND OF THE INVENTION

Reeling and unreeling devices for use in operating a driving arrangement for use with for instance, a radio antenna, are known in the prior art. U.S. Pat. No. 2,896,870 in the name of James F. Ulrich, dated July 28, 1959, and entitled Clutching Mechanism is exemplary of one arrangement for extending and retracting a radio antenna. In such arrangement, a flexible driving mechanism is utilized, which is coiled and uncoiled into and from a storage chamber.

It is likewise known in the prior art to utilize a reeling and unreeling disc member driven by a clutching member which is coupled to the shaft of an electric drive motor in a remote controlled extensible antenna mechanism, and wherein an overload releasing arrangement is provided so that when the antenna reaches its limits of movement, either retracted or extended, and power is sitll being applied to the drive motor, the overload releasing means will permit the clutching member to rotate without driving the reeling and unreeling disc of the mechanism. However, these prior art arrangements generally create undesirable noise and wear when the overload means was actuated, and were not entirely satisfactory.

SUMMARY OF THE INVENTION

The present invention provides a novel clutching mechanism for use for instance with a compact antenna actuating device, and a clutching mechanism which includes a novel overload releasing arrangement.

Accordingly, an object of the invention is to provide a novel compact clutching mechanism which includes an overload releasing arrangement for preventing injury to the drive motor of the device, and wherein the overload releasing mechanism operates smoothly and without substantial noise when actuated.

Another object of the invention is to provide a mechanism for extending and retracting a radio antenna for a motor vehicle, and wherein a reeling and unreeling mechanism includes a rotatable gripping actuating member and a rotatable clutch member, with the clutch member being coupled to the motor, and having coupling means on the clutch and on the actuating members for causing rotation of the actuating member upon rotation of the clutch member, together with overload releasing means for automatically releasing the coupling between the clutch and actuation members upon predetermined torsional stress being applied to the connection between the members, and wherein ramp means is associated with at least one of the coupling means, for preventing undesirable sound and wear in the releasing means.

A still further object of the invention is to provide a mechanism of the latter type wherein the coupling means on the clutch member and the actuating members include abutments projecting outwardly with respect to adjacent surface of the associated member, and which are staggered with respect to the axis of rotation of the clutch and actuating members, and wherein the abutments on one of the members comprise spring loaded balls mounted on the respective member, and the abutments on the other member comprise raised embossments formed from the material of the respective member.

A further object of the invention is to provide a mechanism of the above type wherein the abutments on at least one of the members include ramp means associated with each of the abutments so that when the stress between the abutments on the members results in an overload, causing the abutments on one of the members to ride over the confronting abutments on the other of the members, such overriding abutments move smoothly along the confronting ramp means and with substantially no noise in the clutching mechanism when overload release occurs.

Other objects and advantages of the invention will be apparent from the following description taken in conjunction with the accompanying drawings wherein:

BRIEF DESCRIPTION OF THE DRAWINGS

FIG. 4 is a sectional view taken generally along the plane of line 4—4 of FIG. 2 looking in the direction of the arrows and illustrating the rotatable gripping or actuating member and the rotatable clutching member which is secured to the shaft of the electric drive motor of the mechanism;

FIG. 5 is a generally perspective view of the clutching member per se of the mechanism;

FIG. 6 is a side elevational view of the clutching and actuating members assembled onto the shaft of the drive motor, and showing the abutment means on each of the members which are adapted for coupling engagement to cause rotation of the actuating member upon rotation of the clutching member;

FIG. 7 is an enlarged, generally diagrammatic perspective view of one of the formed abutments on the actuating member showing the ramp associated therewith and also showing the grooved pathway formed in one side of the ramp structure for providing for expeditious return of the ball abutment on the clutch member when the electric motor is reversed, and which aids in preventing movement of the ball over the ramp upon reversal of the motor drive;

DESCRIPTION OF PREFERRED EMBODIMENTS

Figure 1:
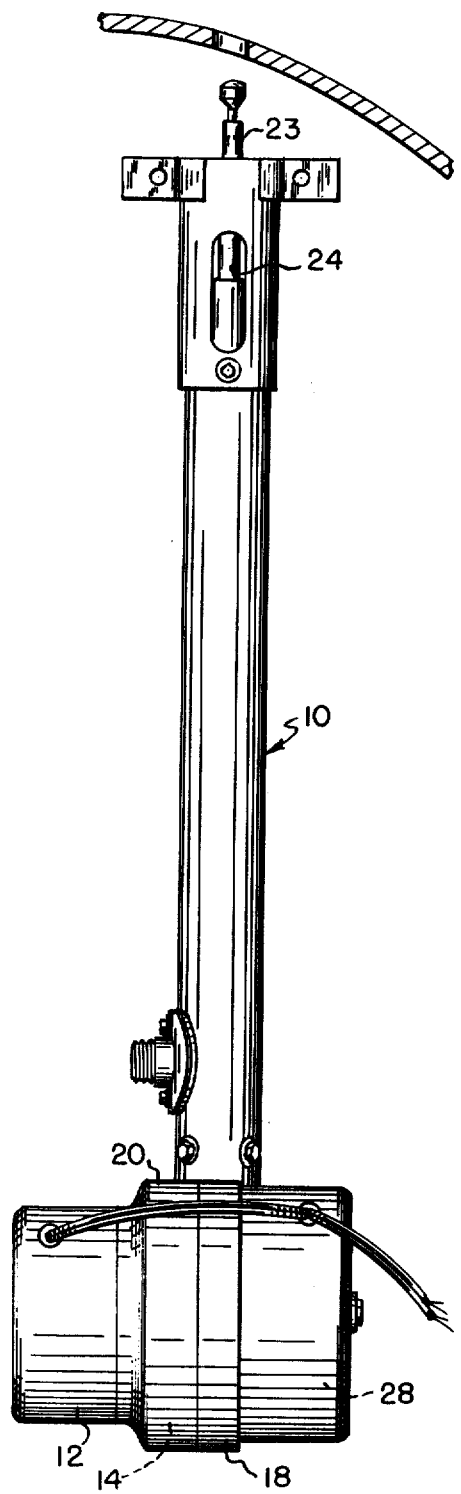
FIG. 1 is an elevational view of an electrically driven radio antenna embodying the invention.
Figure 2:
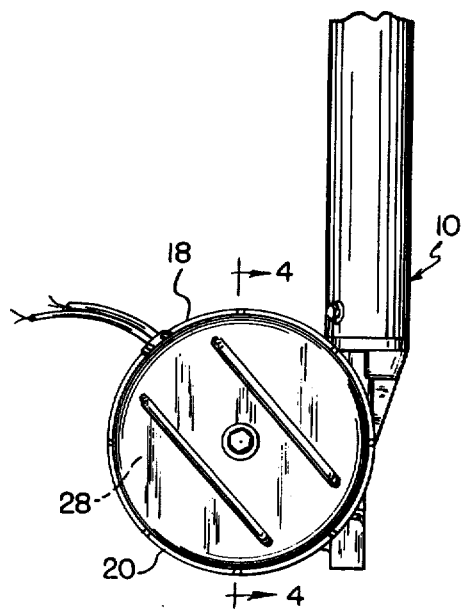
FIG. 2 is a fragmentary end elevational view of the extensible and retractable antenna mechanism illustrated in FIG. 1.
Figure 3:
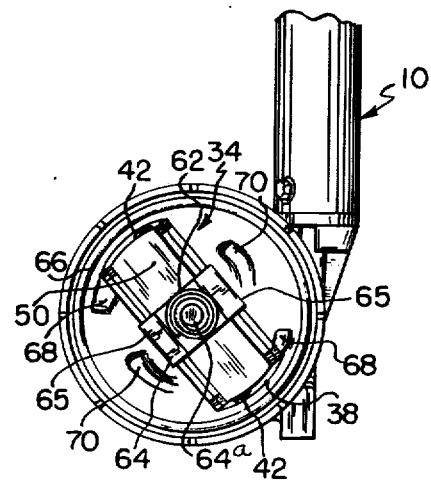
FIG. 3 is a view taken generally along the plane of line 3—3 of FIG. 4 looking in the direction of the arrows.
Figure 8:
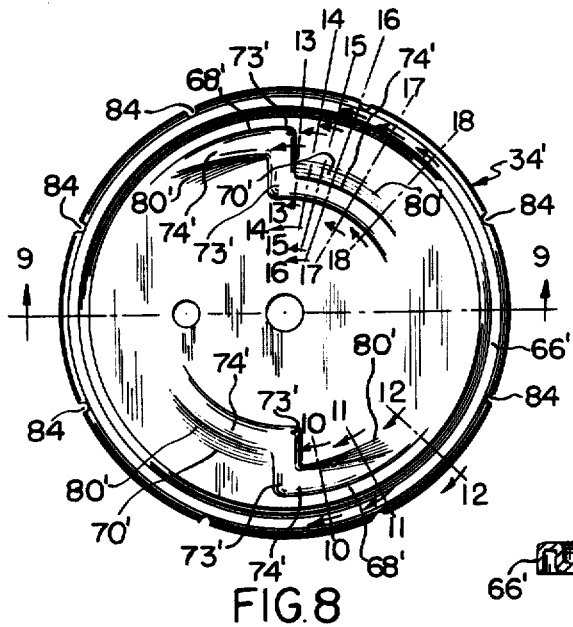
FIG. 8 is an elevational view of another embodiment of rotatable gripping or actuating plate for use in the mechanism of FIG. 1.
Figure 15:
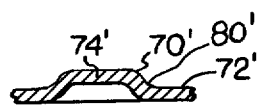
FIG. 15 is a sectional view taken along the plane of line 15—15 of FIG. 8, looking in the direction of the arrows.
Figure 9:
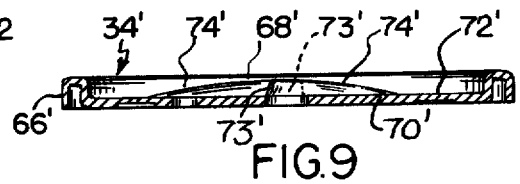
FIG. 9 is a sectional view taken along the plane of line 9—9 of FIG. 8, looking in the direction of the arrows.

Referring now again to the drawings, there is illustrated one embodiment of the invention and more particularly a reeling and unreeling arrangement for projecting and retracting a sectional radio antenna 10 of an extensible and retractable type.

The antenna drive mechanism comprises a preferably reversible electric motor 12 whose shaft (not shown) extends generally horizontally into a transmission chamber 14 which may include a geared speed reduction unit (not shown) for transmitting the power from the electric motor to a shaft 16 (FIG. 4) rotatably mounted on a partition wall 18.

Partition wall 18 divides the housing 20 of the antenna mechanism and partially defines a coil storage chamber 21 for receiving in coiled condition a flexible driving element 22, which is coupled to the extensible antenna sections 23, 24, for extending and retracting the latter.

On the other side of partition 18 is the clutching chamber 28 which houses the clutching mechanism 30 (FIG. 4) for clutching the rotary shaft 16, which is positively coupled to the electric motor by the aforementioned geared reduction unit, to the rotatable element gripping plate or actuating disc 34, rotatably mounted in chamber 28 for rotation therein upon driving of shaft 16. Reference may be had to aforementioned U.S. Patent 2,896,870 for a more detailed explanation of an elongated flexible driving element 22 and its connection to the sectional extensible and retractable antenna, and of the geared transmission means which couples the electric motor to the shaft 16 for rotation of shaft 16 and thus driving of a clutching member 38.

Clutching member 38 upon rotation thereof operates to clutch the rotation of the shaft 16 to the flexible element gripping member or antenna actuating disc 34, thus causing reeling and unreeling of the flexible driving element 22, to cause retraction and extension of the antenna sections 23, 24.

Clutching assembly 30 in the embodiment illustrated comprises the aforementioned clutching member 38 (FIGS. 5 and 6) which is generally U-shaped in end elevation, and which is secured as by means of pin 40 to the shaft 16. Pin 40 extends through openings 40a in clutching member 38 and through a complementary opening in shaft 16, to a position slightly laterally of said flanges 41 of member 38. Member 38 has diagonally arranged slots 42 (FIGS. 5 and 6) formed therein with the slots having raised peripheral edges 44 on the outer side of member 38, or guiding movement of balls, such as steel ball bearing elements 46, lengthwise thereof. Balls 46 are adapted to readily move lengthwise of the respective slot 42. Slots 42 preferably are disposed at an angle of approximately 45 degrees with respect to the lengthwise axis of member 38.

It will be seen that when clutching member 38 is rotating for instance in the direction of the full arrow of FIG. 6, the balls will be located in their respective slot in the full line position illustrated. When the drive motor 12 and thus the clutching member 38 are reversed to drive in the direction of the dot-dash arrow, the balls will move lengthwise with respect to the respective slot to the phantom line position of the balls illustrated.

Mounted flush against the outer side of clutching member 38 is a generally U-shaped retainer member 50 which engages the raised peripheral edges 44 of slots 42, but ordinarily is spaced from balls 46. Member 50 is biased by resilient spring member 62, which in the embodiment illustrated is a conical coil spring, and which in turn reacts against fastener member 64a adjustably positioned on the end of shaft 16, to resiliently urge retainer member 50 in the direction of the balls 46. A cover member 64 fits over the members 50, 38 and prevents the pin 40 from inadvertent movement out of its coupling relation to the clutching member 38. As can be seen from FIG. 4, member 64 is engaged by spring 62 and bears against retainer member 50. Side flanges 65 of cover member 64 encompass members 38 and 50 and extend past the ends of pin 40. Thus, it will be seen that the ball members 46 are movably retained in their associated slots 42 and member 38 with balls 46 are urged toward the gripping plate 34.

The element gripping plate 34 comprising the antenna actuating member, is provided with an exterior circumferential flange 66 defining a circular recess 67 in which is received the flexible driving element 22 for unreeling and reeling the latter to cause raising and lowering of the associated antenna during predetermined rotation of the element gripping member 34. Member 34 rides on the partition 18 and is urged toward the partition 18 by the ball members 46 engaging member 34. Recess 67 may have detents (not shown) formed therein as disclosed in aforementioned U.S. Pat. No. 2,896,870, in order to facilitate frictional engagement between actuating member 34 and the driving element 22, during extension of the antenna.

Formed on the outer side of rotatable actuating member 34 are pairs of abutment means 68, 70 which in the embodiment illustrated are formed or extended from the material of the plate 34, so that they project outwardly with respect to the adjacent surface 72 of the actuating member. Abutment means 68, 70 each comprise a frontal abutment surface 73 (FIGS. 6 and 7) and a sloping inclined surface 74 which slopes inwardly from the outer extremity of the respective abutment surface 73, to merge with the adjacent surface 72 of the associated actuating member.

It will be noted that abutments 68 are disposed on a larger diameter circle than are abutments 70, so that when the balls are disposed in their full line positions in their respective slots, as shown for instance in FIG. 6, the balls will engage the respective frontal surface 73 of abutments 68 and would miss or be movable past or outside of the abutments 70. When the balls are in the phantom line position illustrated in FIG. 6 and with clutch member 38 rotating in the direction of the phantom line arrow, the balls 46 will engage the respective abutment 70 disposed on the lesser diameter concentric circle, and will miss or pass inside of the abutments 68. While only two pairs of abutments have been illustrated on member 34, it will be understood that a greater number of pairs may be provided. Such an arrangement would result in less "slip" before the abutment balls on clutch 38 engaged in abutting relation with the abutments on actuating or gripping member 34 to cause rotation of the latter and thus actuation of the antenna.

Operation of the mechanism may be as follows: Upon energization of the motor 12, the shaft 16 is rotated causing rotation of the clutching assembly 30, and say for instance in the direction of the full line arrow of FIG. 6. Rotation of the clutching assembly causes the ball members 46 to be positioned in thier associated slot in the full line condition illustrated in FIG. 6 whereupon when the clutching member 38 has rotated to position each of the balls in confronting abutting condition with frontal surface 73 on abutments 68, the engagement between the balls in the respective frontal surface 73 causes the actuating plate 34 to rotate with the rotation of the shaft 16, therefore causing the elongated flexible driving element to be reeved, and for instance causing retraction of the associated radio antenna elements 23, 24.

Reversal of the electric motor by means of for instance a manual control switch (not shown) will cause the balls 46 to commence moving lengthwise of the associated slot to the phantom line position illustrated in FIG. 6, and when in such phantom line position and upon predetermined rotation of the clutching member 38, the balls 46 will be positioned against the frontal surfaces 73 of abutment means 70 which are disposed on a concentric circle which is of a lesser diameter than the circle on which abutments 68 are disposed. Engagement of the balls 46 with the frontal surfaces of the abutments 70 will, of course, cause rotation of the actuating plate 34 in the opposite direction to cause, for instance, extension of the radio antenna, and uncoiling of the flexible driving element 22 from the storage chamber 21.

In the event that the flexible driving element extends or retracts the radio antenna to its maximum position, then the motor, if it is still energized, will of course be forcing the balls against frontal abutment surfaces 73 on plate 34 which can no longer rotate. Thereupon, due to the resiliently biased condition of the clutching assembly 30, the balls are forced over the confronting frontal surfaces 73 and down the respective inclined surface 74, so as to release the coaction between the abutment means, and thereby preventing damage to the electric motor. The inclined surface 74 of abutments 68, 70 as at 77 (FIGS. 4 and 7) preferably slopes outwardly in a direction generally transverse of the respective abutment, so that as the respective ball passes along the ramp during release due to overloading, the ball is urged to maintain its position at one end of the respective slot.

In the event that reversal of the drive motor and thus reversal of the clutching assembly occurs prior to movement of the balls completely out of the range of say for instance the respective outer abutment 68, then the ball is adapted to move into a path or groove 80 at least partially formed in the respective abutment, which guides the return or reverse movement of the ball and aids in moving it along its associated slot 42 in clutch member 38 and prevents the ball from riding back on the inclined surface of the adjacent abutment, so that substantially no adverse sound is produced during reversal of the mechanism.

Referring now to FIGS. 8 through 19, there is illustrated another embodiment of actuating plate 34' which has pairs of abutment 68', 70' formed, in the embodiment illustrated, from the material of the plate. The peripheral edge of the flange 66' of the plate has indentations 84 (FIG. 8) formed therein in order to facilitate frictional engagement between the actuating plate and, for instance, the driving element 22, illustrated in FIG. 4, during rotation of the actuating plate 34' for extension and retraction of the associated antenna member.

Each of the abutment means 68', 70' comprises a frontal abutment surface 73' (FIGS. 8 and 9) and an associated inclined ramp surface 74' which slopes inwardly from the outer extremity of the respective frontal abutment surface 73' to merge with the adjacent surface 72' of the actuating member and in a generally similar manner as aforedescribed in conjunction with the first embodiment of actuating or gripping plate.

Abutments 68' are disposed on a larger diameter circle as compared to abutments 70', so that when the balls 46 of the clutching member 38' (FIG. 19) are disposed in their full line position in their respective slots 42 as shown, the balls 46 will engage frontal surface 73' of respective abutment 68', and would be on a circle circumference which is outside the diameter of the abutments 70'. Conversely, when the balls are in their phantom line position illustrated in FIG. 19 and with the clutch member 38' rotating in the opposite direction, the balls 46 will engage the respective abutment 70' disposed on the lesser diameter concentric circle, and will pass inside of the abutments 68'.

Figure 10:
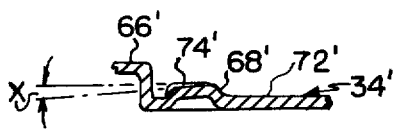
FIG. 10 is a sectional view taken along the plane of line 10—10 of FIG. 8, looking in the direction of the arrows.
Figure 16:
FIG. 16 is a sectional view taken along the plane of line 16—16 of FIG. 8, looking in the direction of the arrows.
Figure 11:
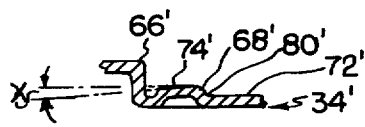
FIG. 11 is a sectional view taken along the plane of line 11—11 of FIG. 8, looking in the direction of the arrows.
Figure 17:
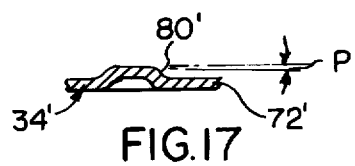
FIG. 17 is a sectional view taken along the plane of line 17—17 of FIG. 8, looking in the direction of the arrows.
Figure 12:
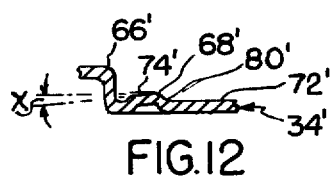
FIG. 12 is a sectional view taken along the plane of line 12—12 of FIG. 8, looking in the direction of the arrows.
Figure 18:
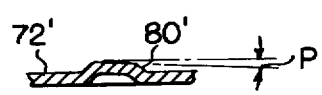
FIG. 18 is a sectional view taken along the plane of line 18—18 of FIG. 8, looking in the direction of the arrows.
Figure 13:
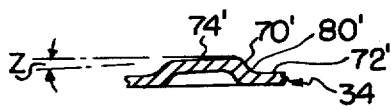
FIG. 13 is a sectional view taken along the plane of line 13—13 of FIG. 8, looking in the direction of the arrows.
Figure 14:
FIG. 14 is a sectional view taken along the plane of line 14—14 of FIG. 8, looking in the direction of the arrows.
Figure 19:
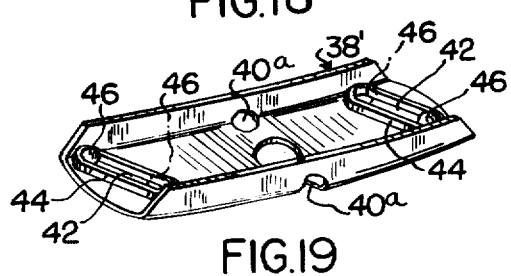
FIG. 19 is a perspective view of a clutching member for use with the actuating plate of FIGS. 8 and 9.

As can be observed from FIGS. 10 through 12, the inclined ramp surface 74' of each abutment 68' slopes generally outwardly in a direction generally transverse of the respective abutment. As can be seen from FIGS. 10, 11 and 12, this transverse slope of each outer abutment 68' is in the embodiment illustrated, at an angle X of approximately 5° with respect to the horizontal.

The transverse slope of each abutment 70' varies from an inwardly sloping angle Z (FIG. 13) taken along the section line 13—13, and which in the embodiment illustrated is preferably approximately 4° with respect to the horizontal, to an angle Y taken along section line 14—14, and which in the embodiment illustrated is preferably approximately 2° with respect to the horizontal, to a substantially horizontal condition (FIGS. 15 and 16), and thence to an outwardly transverse sloping angle P of approximately 3° with respect to the horizontal. At its distal end, the abutment 70' merges smoothly with adjacent planar surface 72' of the actuating plate as illustrated, for instance, in FIG. 9.

Moreover, in this embodiment, the diagonal slots 42 of the clutching member 38' (FIG. 19) are oriented obliquely in a direction opposite to that of the first described embodiment of slots 42 of clutching member 38. However, the same operative effect of movement of the ball members 46 occurs in conjunction with clutching member 38' in that upon rotation of the clutching member in one rotary direction, the balls move to a corresponding end of the respective slot for engagement with the corresponding abutment on the actuating member to thus cause rotation of the actuating member 34' with the clutching member 38'. Likewise, in the event that the operating element being actuated by actuating member 38' is moved to its maximum position, then the resilient biased condition of the clutching assembly enables the balls 46 of clutching member 38' to be forced over the confronting frontal surface 73' of the respective abutment and along the inclined ramp surface 74' so as to release the coaction between the abutment means, and thereby prevent damage to the driving motor.

It will be seen that the outwardly sloping relation in a direction transverse of the abutments 68', 70' aids in maintaining the abutment balls 46 at the respective end of the operating slot in the event of "override" of the clutch. Moreover, the latter in conjunction with pathway or track 80' at the mergence of the respective abutment with adjacent planar surface 72' of the actuating member aids in movement of the respective ball on the clutching member into confronting relation with the respective abutment surface in the event of reversal of the clutching assembly.

From the foregoing description and accompanying drawings it will be seen that the invention provides a novel mechanism for coupling a motor to a driving element for use in actuating an attached member, such as for instance in extending and retracting an antenna, and wherein there is included a rotatable clutching assembly including a rotatable clutching member, with abutment means located on the clutching member and on an actuating member. The actuating member is adapted, in the embodiment illustrated, to grip a flexible driving element and coil and uncoil it from an associated chamber, with the abutment means on the members being adapted for abutting engagement for causing rotation of the actuating member upon rotation of the clutching member in either direction of rotation of the motor. At least one of the abutment means is resiliently biased to provide an overload release, so that when the flexible driving element is extended or retracted its maximum permissible amount, the abutment means on one member can ride over the abutment means on the other member to prevent injury to the driving motor. The abutment means on at least one of the members has ramp means coacting therewith for preventing sudden movement and undesirable noise between the abutment means, in the event that the driving connection between the clutching member and the actuating member is released due to overload.

The terms and expressions which have been used are used as terms of description and not of limitation and there is no intention in the use of such terms and expressions of excluding any equivalents of any of the features shown or described or portions thereof, and it is recognized that various modifications are possible within the scope of the invention claimed.

What is claimed is:

1. In a mechanism which includes a drive motor and an actuating member for causing actuation of an associated operative element, and releasable clutching means for clutching said actuating member to said motor for causing actuation of said actuating member and thus operation of the operative element, said clutching means comprising a rotatable clutch member for clutching the power of the motor to the actuating member, abutment means on said clutch member and on said actuating member, said abutment means on said clutch member being adapted for abutting engagement with said abutment means on said actuating member for causing rotation of the latter during energization of the motor, ramp means coacting with said abutment means on one of said members for preventing sudden movement and undesirable sound between said abutment means in the event that the driving connection between the clutch member and said actuating member is released when the stress between the abutment means results in an overload causing one of the abutment means to override the confronting abutment means, and said abutment means on the other of said members comprising a rollable element and wherein said motor is of reversible drive type, said members having a coincident axis of rotation, said abutment means on one of said members comprising a plurality of abutments which are located at predetermined different distances from the axis of rotation of said members, certain of said abutments being operative during rotation of said one member in one rotary direction, while the other of said abutments are operative during rotation of said one member in the opposite rotary direction.

2. A mechanism in accordance with claim 1 wherein said abutment means on the respective member projects outwardly with respect to the adjacent surface of the respective member and in a direction toward the confronting of said members, at least one of said abutment means being mounted so as to be resiliently biased away from said adjacent surface of the respective member and in a direction toward said confronting member.

3. A mechanism in accordance with claim 1 wherein said abutment means on the respective member projects outwardly with respect to the adjacent surface of the respective member and in a direction toward the confronting of said members, said rollable element abutment means is on said clutch member and comprises at least one ball-like member mounted in an elongated slot in said adjacent surface of said clutch member, and said abutment means on said actuating member comprising at least a pair of raised abutments thereon adapted for engagement with the ball member, and wherein said ramp means comprises sloped inclines sloping inwardly from the outer extremity of the respective abutment on said actuating member to merge with said adjacent surface of the actuating member.

4. A mechanism in accordance with claim 1 wherein said abutments are on said actuating member and said rollable element abutment is on said clutch member, and including means coacting with each of said abutments on said actuating member for facilitating reverse movement of said abutment on said clutch member without passing over an immediately passed abutment on said actuating member.

5. A mechanism in accordance with claim 1 wherein one of said abutments on said actuating member faces in one rotary direction while the other of said abutments on said actuating member faces in the opposite rotary direction, for coupling said actuating member to said clutch member in both directions of rotation of the latter member.

6. A mechanism in accordance with claim 4 wherein each of said abutments on said actuating member comprises a protrusion projecting outwardly with respect to the adjacent surface of said actuating member and in a direction toward the confronting clutch member, said means coacting with each abutment comprises a pathway formed adjacent the juncture of the respective protrusion and said adjacent surface of said actuating member.

7. A mechanism in accordance with claim 2 wherein said rollable element comprises a rollable ball-like member movably mounted in an elongated slot in said adjacent surface in guided, rollable relation.

8. A mechanism in accordance with claim 2 wherein the clutch member comprises a channel-shaped element which is coupled to a shaft which in turn is coupled to the motor, said channel-shaped element having elongated diagonally arranged slots formed therein with a rollable ball member comprising said rollable element, being received in each of said slots, and means overlying the ball members and being resiliently urged into engagement with said clutch member to generally resiliently urge the ball members into engagement with the confronting surface of said actuating member, said actuating member having protrusions formed from the material thereof and extending outwardly from said adjacent surface of the actuating member, said protrusions comprising said abutment means on said actuating member and adapted for abutting coaction with a respective ball member of the clutch member for causing rotation of said actuating member upon rotation of said clutch member, said protrusions being located at different distances from the axis of rotation of said clutch and actuating members, certain of said protrusions being operative to coact with said ball members during rotation of said clutch member in one rotary direction, while other of said protrusions are operative during rotation of said clutch member in the opposite rotary direction.

9. A mechanism in accordance with claim 1 in combination with an associated operative element, the latter comprising an elongated flexible driving cable for extending and retracting a vehicle remote control radio antenna, and including a coil storage chamber adapted to receive at least a portion of said cable coiled therein, said actuating member coacting with said cable for coiling and uncoiling the latter into and from said chamber upon predetermined rotation of said actuating member.

10. A mechanism in accordance with claim 9 wherein the rotatable actuating member comprises a plate having a central opening therethrough through which extends a shaft operatively coupled to said motor, and cavity means formed in the plate for receiving therein the elongated flexible driving cable and gripping it during rotation of said plate to accomplish feeding of said driving cable into and from said storage chamber.

11. A mechanism in accordance with claim 9 including a partition means separating the coil storage chamber from the rotatable actuating member, the latter engaging and riding on said partition means, and in coaction with the latter defining a revolving generally circular cavity which receives therein the flexible driving cable to accomplish coiling and uncoiling of the driving cable into and from said storage chamber.

12. A mechanism in accordance with claim 6 wherein said pathway for facilitating return of the abutment on the clutch member past the protrusion abutment on the actuating member is of curvilinear configuration in elevation, said rollable element being adapted to roll in the pathway and bypass the protrusion abutment on said actuating member upon reversal of said clutch member.

13. A mechanism in accordance with claim 2 wherein said rollable element on said clutch member comprises a steel ball which is adapted to be movable relative to the clutch member, and which is adapted to move lengthwise of a retaining elongated diagonally oriented slot in said clutch member.

14. An actuating member for use in an override clutching mechanism wherein a reversible motor is coupled to a clutching means for clutching said actuating member to the motor to thus cause rotation of said actuating member, said actuating member comprising a rotatable plate-like member having a central axis of rotation, and abutment means projecting outwardly from one side of said plate-like member, said abutment means comprising a plurality of protrusions having abutment faces thereon and which are located at predetermined different distances from said axis of rotation, certain of said protrusions facing in one rotary direction and being operative during rotation of said member in said one rotary direction, while other of said protrusions face in the opposite rotary direction and are operative during rotation of said plate-like member in said opposite rotary direction.

15. An actuating member in accordance with claim 14 wherein said abutment faces on said certain and said other protrusions are disposed generally along a single radial plane passing through said axis, but with said faces being spaced radially with respect to one another.

16. A mechanism in accordance with claim 3 wherein said ramp means slopes outwardly in a direction generally transverse of the latter.

17. A mechanism in accordance with claim 3 wherein there is provided a pair of said ball-like members, each of which is mounted in a respective slot in said adjacent surface of said clutch member, and said abutment means on said actuating member comprises at least two pair of said raised abutments thereon, each of said raised abutments having ramp means coacting therewith, certain of said ramp means sloping inwardly in one rotary direction of said actuating member, while other of said ramp means slopes inwardly in the opposite rotary direction of said actuating member.

18. In a mechanism which includes a drive motor and an actuating member for causing actuation of an associated operative element, and releasable clutching means for clutching said actuating member to said motor for causing actuation of said actuating member and thus operation of the operative element, said clutching means comprising a rotatable clutch member for clutching the power of the motor to the actuating member, abutment means on said clutch member and on said actuating member, said abutment means on said clutch member being adapted for abutting engagement with said abutment means on said actuating member for causing rotation of the latter during energization of the motor, ramp means coacting with said abutment means on one of said members for preventing sudden movement and undesirable sound between said abutment means in the event that the driving connection between the clutch member and said actuating member is released when the stress between the abutment means results in an overload causing one of the abutment means to override the confronting abutment means, said motor being of the reversible drive type, said abutment means on one of said members comprising a plurality of abutments which are located at predetermined different distances from the axis of rotation of said one member, certain of said abutments being operative during rotation of said one member in one rotary direction while the other of said abutments are operative during rotation of said one member in the opposite rotary direction, and said abutment means on the other of said members comprising an element movable relative to said other member, and responsive to the direction of rotation of the latter.

19. A mechanism in accordance with claim 18 wherein said abutments comprise protrusions having abutment faces thereon, certain of said abutments on said one member facing generally in one rotary direction and being operative during rotation of said one member in the last mentioned rotary direction while other of said abutment on said one member face generally in the opposite rotary direction and are operative during rotation of said one member in said opposite rotary direction.

* * * * *